(12) United States Patent
Petronilli et al.

(10) Patent No.: US 12,385,582 B2
(45) Date of Patent: Aug. 12, 2025

(54) FLEXIBLE HOSE WITH A QR CODE

(71) Applicant: FITT S.P.A., Sandrigo (IT)

(72) Inventors: Andrea Petronilli, Padua (IT); Luca Strazzari, Sandrigo (IT)

(73) Assignee: FITT S.P.A., Sandrigo (IT)

( * ) Notice: Subject to any disclaimer, the term of this patent is extended or adjusted under 35 U.S.C. 154(b) by 189 days.

(21) Appl. No.: 18/029,791

(22) PCT Filed: Sep. 24, 2021

(86) PCT No.: PCT/IB2021/058716
§ 371 (c)(1),
(2) Date: Mar. 31, 2023

(87) PCT Pub. No.: WO2022/079528
PCT Pub. Date: Apr. 21, 2022

(65) Prior Publication Data
US 2023/0366492 A1    Nov. 16, 2023

(30) Foreign Application Priority Data

Oct. 13, 2020   (IT) .................. 102020000024055

(51) Int. Cl.
| | |
|---|---|
| *F16L 11/12* | (2006.01) |
| *B29C 48/09* | (2019.01) |
| *B29C 48/151* | (2019.01) |
| *F16L 11/08* | (2006.01) |
| *B29L 23/00* | (2006.01) |

(52) U.S. Cl.
CPC ............ *F16L 11/124* (2013.01); *B29C 48/09* (2019.02); *B29C 48/151* (2019.02); *F16L 11/085* (2013.01); *B29L 2023/005* (2013.01); *F16L 2201/60* (2013.01)

(58) Field of Classification Search
None
See application file for complete search history.

(56) References Cited

FOREIGN PATENT DOCUMENTS

| | | |
|---|---|---|
| DE | 102006011619 A1 | 9/2007 |
| EP | 2233812 A1 | 9/2010 |
| EP | 2711169 A1 | 3/2014 |
| EP | 3061620 A1 | 8/2016 |
| JP | 62-83192 A | 4/1987 |
| JP | 7-208660 A | 8/1995 |
| JP | H7-208660 A | 8/1995 |
| JP | 2000-81172 A | 3/2000 |

(Continued)

OTHER PUBLICATIONS

Written Opinion of the International Searching Authority for Application No. PCT/IB2021/058716, from the European Patent Office as ISA, dated Jan. 17, 2022 (8 pages).

(Continued)

*Primary Examiner* — Joseph S Del Sole
(74) *Attorney, Agent, or Firm* — Kilyk & Bowersox, P.L.L.C.

(57) ABSTRACT

A flexible hose for the transportation of liquids or fluids comprising at least one layer (10) with an exposed surface (11) made of a first polymeric material, the at least one layer (10) having at least one QR code (40) according to the ISO/IEC 18004:2000(E) standard. The at least one QR code (40) includes at least one ink layer (41) printed on at least one portion (12) of the exposed surface (11) of the hose, the ink being compatible with the first polymeric material.

9 Claims, 1 Drawing Sheet

(56) References Cited

FOREIGN PATENT DOCUMENTS

JP      2007333519 A    12/2007

OTHER PUBLICATIONS

International Search Report for Application No. PCT/IB2021/058716, from the European Patent Office as ISA, dated Jan. 17, 2022 (3 pages).
International Standard, "ISO/IEC 18004", International Standards, Jun. 15, 2000.
Hose Handbook, Rubber Manufacturers Association, Dec. 31, 2003.
Eric Steinwachs, Q&A: Heat Transfer vs. Hot Stamping, United Silicone, August 3, 20234.
Gardena, "Gardena 2014 Arrosage," Dec. 31, 2014.

FLEXIBLE HOSE WITH A QR CODE

FIELD OF THE INVENTION

The present invention relates to the technical field of flexible hoses, for example irrigation hoses, and in particular it relates to a garden hose with QR code, as well as a method for the manufacturing thereof.

Definitions

In the present text, the expression "reinforcement textile layer" or its derivatives is used to indicate a layer consisting of at least one textile yarn arranged on the underlying layer. The "reinforcement textile layer" is arranged on the bearing layer so as to leave portions thereof free, generally square, rectangular or rhomboidal-shaped.

In the present document, the expression "cross-hatched textile layer" or "cross-hatching" or its derivatives is used to indicate a layer consisting of at least two yarns or groups of yarns spiral-wound on the bearing layer with opposite inclinations and mutually superimposed but not connected. Thus, a cross-hatching is made up of two or more superimposed spirallings.

In the present text, the expression "knitted textile layer" or "knitting" or derivatives is used to indicate a layer consisting of at least two yarns or groups of yarns deposited on the bearing layer and connected together to form a plurality of chain stitches, "stitches" of the tricot type.

In the present document, the expression "compatible materials" or derivatives is used to indicate materials which have mutual chemical and/or physical compatibility, that is materials which, once coupled, give rise to a joint suitable to withstand the transfer of tensile or shear forces through the contact surface. Thus, the maximum compatibility will be observed in identical materials or materials having matrices of the same base.

In the present document, the expression "matrix" of a polymer or its derivatives is used to indicate a polymeric material capable of providing the molecular structure of the finished product.

In the present document, the expression "providing" or its derivatives is used to indicate the preparation of an element of interest to a process step of interest, thus including any preventive treatment aimed at the optimal execution of the step of interest, from simple collection and possible storage to heat and/or chemical and/or physical pre-treatments and the like.

State of the Art

It is known that garden hoses are sold in packages which include at least one decorative laminar element, generally a cardboard disc, on which various information is printed. These may also include a QR code which, suitably scanned by a special reader, traces back to a web address which contains various information.

A clear disadvantage of the above is that the decorative element is normally thrown away once the package is opened, thus when using the hose it is impossible to track the web address by means of the QR code.

On the other hand, flexible hoses for the transportation of fluids in the industrial field which include one or more QR codes, for example QR codes intended to be scanned by a specific reader, are known.

For example, patent application EP3061620 discloses a flexible hose for the transportation of fluids at industrial level made of elastomeric material which has—on the outer surface thereof—a two-dimensional barcode obtained by engraving the surface and filling the grooves thus formed with ink.

The two-dimensional barcode thus made has a high abrasion resistance. However, the hose is very slow and difficult to manufacture, particularly during the engraving step and subsequent filling of the engraved grooves with the ink. This makes this hose poorly cost-effective.

SUMMARY OF THE INVENTION

The object of the present invention is to overcome the drawbacks outlined above by providing a flexible hose with a QR code that is highly effective and relatively cost-effective.

A further object of the present invention is to provide a flexible hose with QR code that is simple to manufacture.

A further object of the present invention is to provide a flexible hose with QR code having a good abrasion resistance.

Another object of the present invention is to provide a flexible hose with QR code that can be easily read by a reader even should the hose be damaged or in case of obsolescence of the reader.

These and other objects, which will be more apparent hereinafter, are attained by a flexible hose with QR code, as well as a method for the manufacturing thereof, as described and/or claimed and/or illustrated herein.

BRIEF DESCRIPTION OF THE DRAWINGS

Further characteristics and advantages of the invention will be more apparent in light of the detailed description of some preferred but non-exclusive embodiments of the invention, illustrated by way of non-limiting example with reference to the attached drawings, wherein.

DETAILED DESCRIPTION OF SOME PREFERRED EMBODIMENTS

Figure 1:
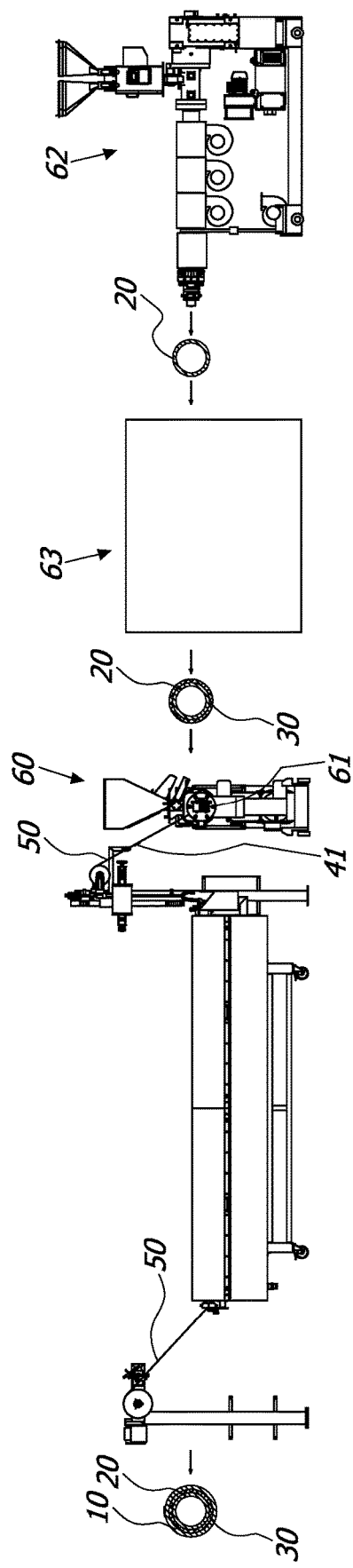
FIG. 1 is a schematic view of a line for the production of the hose 1.
Figure 2:
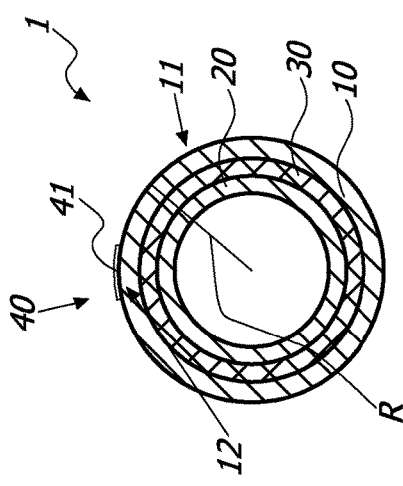
FIG. 2 is a sectional view of the hose 1.
Figure 3:
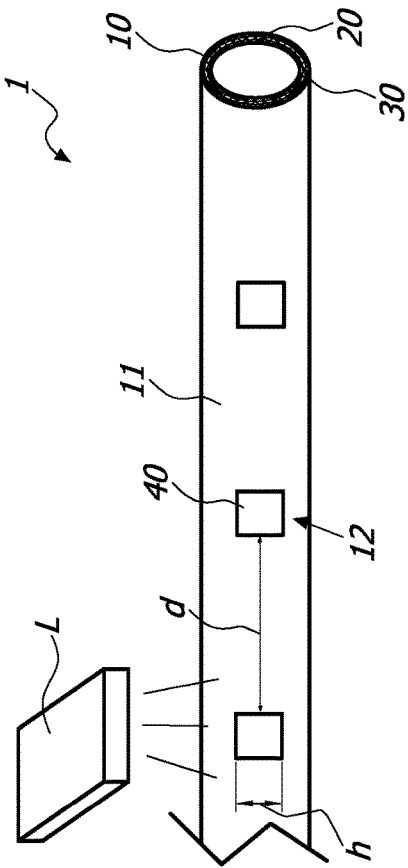
FIG. 3 is a lateral view of the hose 1.

With reference to the mentioned figures, herein described is a flexible garden hose 1 for irrigating flowers, plants or the like. Such hoses are, in a per se known manner, suitable to be connected to a domestic water mains by means of a special fitting, so that the hose transports drinking water from the appliance of the domestic water mains, for example a tap, to the point to be irrigated, for example a garden, a flowerbed or the like.

Although hereinafter reference will always be made to a garden hose, it is clear that the hose according to the invention may be used for any purpose without departing from the scope of protection of the attached claims.

For example, the hose of the present invention may be a technical hose which includes one or more layers, which may be reinforced with textile and/or metal threads or with a metal or plastic spiral embedded in the wall of the hose.

However, in a preferred but non-exclusive embodiment, the hose 1 may be a garden hose consisting of an outer layer 10, an inner layer 20 designed to come into contact with the drinking water to be transported and a textile reinforcement layer 30 interposed between the outer layer 10 and the inner layer 20.

The outer layer 10 may have an exposed surface 11, which may be designed to be gripped by a user and therefore be the outermost surface of the hose 1 or it may be covered by a further layer configured to allow a user to view the surface 11. For example, the further covering layer may be fully or partially transparent or translucent.

The aforementioned layers 10, 20 may be made of a polymeric material with a plasticised PVC matrix, of the per se known type. For example, the layer 20 may have a Shore A hardness measured according to the ASTM D 2240 standard comprised in a range between 60 ShA and 90 ShA, and preferably comprised between 65 ShA and 85 ShA, whereas the layer 10 may have a Shore A hardness measured according to the ASTM D 2240 standard comprised in a range between 50 ShA and 80 ShA, and preferably comprised between 55 ShA and 75 ShA.

Although hereinafter reference will be made to a hose whose layers are made of plasticised PVC, it is clear that the hose according to the invention may be made of any material without departing from the scope of protection of the attached claims.

The textile reinforcement layer 30 may be made of polyester yarn, and may be of the knitted, spiralled or cross-hatched type.

It is clear that the hose may also have only the layer 10 made of plasticised PVC matrix material or that, if present, the layer 20 may be made of any material without departing from the scope of protection of the attached claims.

It is also clear that the outer layer 10 does not necessarily have to be entirely made of plasticised PVC. For example, only the exposed surface 11 thereof is made of the latter material, without departing from the scope of protection of the attached claims.

It is also clear that above or below the aforementioned layers 10, 20 or 30 other layers, both polymeric and textile reinforcement, made of any material may be present, without departing from the scope of protection of the attached claims.

The outer layer 10 may comprise one or more QR codes 40 printed on at least one portion 12 of the exposed surface 11 thereof.

The printing can be carried out with any technique, for example by inkjet.

The QR code may be made according to the ISO/IEC 18004:2000(E) standard.

In a per se known manner, the portion 12 may be designed to be scanned by a QR code reader L, for example a mobile telephone on which a special application is installed.

The QR code reader L may be programmed according to annex J of the SO/IEC 18004:2000(E) standard.

The above will allow to obtain a flexible garden hose with QR code which is particularly cost-effective, given the hose may be manufactured in production line just like a normal garden hose.

This will always allow to track back to the web address or in any case the information contained in the QR code 40 even when using the hose, given that it will be sufficient to scan the two-dimensional barcode present on the hose.

It is clear that the hose 1 may comprise any number of QR codes 40, provided that at least one is provided, without departing from the scope of protection of the attached claims.

In the case of a hose 1 with several QR codes 40, they may be arranged at a mutual distance d equal to or less than 2 metres, preferably equal to or less than 1 metre.

This allows to always have the possibility of tracking back to the web address or in any case the information contained in the QR code 40 even should the hose be cut during use and/or in the case of hose sold per metre and then cut into pieces of any length from a reel.

Preferably, the one or more QR codes 40 may be printed on the surface 11 by hot transfer of at least one respective ink layer 41 compatible with the material that the surface 11 is made of.

Hot transfer is preferred given that it allows the hose to be printed continuously, therefore at a low cost, but with a high print quality, so as to allow the reading of small QR codes.

Even more preferably, the one or more QR codes 40 may be printed on the surface 11 by hot transfer of the silk-screen type, so as to obtain the maximum printing flexibility, reducing the costs thereof.

In order to minimise the cost of manufacturing the hose, it is suitable to standardise a single QR code 40 which can be printed on a range of hoses with external radius R of various sizes, variable for example between a minimum of 4 mm and a maximum of 100 mm.

Therefore, to this end, the one or more QR codes 40 may be square-shaped with a maximum height h of 7 mm on the side, while the matrix thereof may have a maximum of 25×25 modules.

These dimensions ensure good readability even in hoses with minimum external radius R and also in the event of outdated readers.

The data contained in the one or more QR codes 40 may be of any type.

However, the one or more QR codes 40 may suitably contain one or more alphanumeric data including from 20 to 29 characters.

In this manner, the error correction level of the QR code 40 may be of level Q or H, that is it can be read even if the one or more QR codes 40 are damaged at 25% or 30%.

This ensures the possibility of tracking back to the web address or in any case to the information contained in the QR code 40 even after several years of use of the hose.

Preferably, the one or more alphanumeric data present in the one or more QR codes 40 may be a simplified web address connected to a web portal which traces back to an alphanumeric web address having at least 30 characters.

This allows to direct the user to a complex web address containing the size of the QR code 40 at most.

The web address may correspond to a website of any content. For example, the website may contain technical information about the hose, or use instructions and instructions on the proper maintenance thereof. Furthermore, the website may allow to purchase a new hose or spare parts thereof.

The garden hose 1 may be manufactured by firstly providing a semi-finished product on which the one or more QR codes 40 are to be printed and then printing the latter on the former.

The semi-finished product may be manufactured by extruding the layer 10 by means of an extrusion head 60 in the case of a single-layer hose, or, in the case of a three-layer hose, by firstly extruding the layer 20 by means of the extrusion head 62, subsequently knitting, spiralling or cross-hatching the textile reinforcement layer 30 on the layer 20 by means of the machine 63 and then extruding the outer layer 10 on the reinforcement layer 30.

It is clear that in the case of a hose with more than three layers further steps for extruding or manufacturing further textile layers may be provided for, without departing from the scope of protection of the attached claims.

Subsequently, at least one strip made of polymeric material 50, which may include a plurality of QR codes 40 arranged between them at a predetermined distance d, will be provided.

The strip 50 may be made of a material incompatible with the plasticised PVC of the layer 10, for example polyethylene.

Such strip 50 may be coupled with the exposed surface 11 of the layer 10 at the outlet 61 of the extrusion head 60, so as to hot transfer the QR code 40 onto the portions 12.

Subsequently, there may be a step for cooling the layer 10—strip 50 assembly and then, subsequently, a step for removing the strip 50 by coiling it into as reel.

Suitably, at the end of the line there may be an optical control for verifying whether the QR codes 40 have been correctly transferred onto the exposed surface 11.

Advantageously, the compatibility between the ink of the QR codes 40 and the polymeric material of the exposed surface 11 may be such that after having subjected a certain number of portions 12 to a durability test according to the EN 16436-1:2014+A3:2020 standard ("*Rubber and plastics hoses, Tubing and assemblies for use with bread and butane and their mixtures in the vapor phase—part 1: Hoses and tubes*"), and more precisely with the test described in paragraph A.11 of annex A of the aforementioned standard, the QR codes 40 or most of them can still be read using the QR code reader L.

This characteristic will be better illustrated in the following examples.

EXAMPLES

Example 1

10 samples of 1-metre plasticised PVC single-layer hose were manufactured. This plasticised PVC has the following composition:

| Component | % by weight |
| --- | --- |
| PVC K70 RESIN | 57.66 |
| PLASTICIZER DOTP | 38.84 |
| EPOXIDIZED SOYBEAN OIL | 2.88 |
| CA—Zn STABILISING AGENT | 0.61 |
| DYE | 0.02 |

A respective QR code made using acrylic ink was hot transferred onto these samples. The QR code traced back to the website www.fitt.com/it.

Each of the samples thus made was subjected to the durability test according to the test described in paragraph A.11 of annex A of the EN 16436-1:2014+A3:2020 standard.

Based on this test, the printed surface of the hose sample is contacted 10 times in 10 seconds—by means of a suitable device—with a cotton fabric (chosen according to the ISO 105-A02 standard) soaked in demineralised water, with a dry one and with one soaked in peanut oil (CAS 8002-03-7).

After the test was carried out on all the samples, the QR code was read with a reader having the characteristics specified in annex J of the ISO/IEC 18004:2000(E) standard, in this case a smartphone with a special app.

It was therefore found that the reader was able to read the QR code successfully in 9 out of 10 samples.

Example 2

The procedure of example 1 was repeated for a single-layer hose made of Santoprene® 201-73 marketed by ExxonMobil® and acrylic ink.

It was found that the reader (the same of example 1) was able to read the QR code successfully in 3 out of 10 samples.

Example 3

The procedure of examples 1 and 2 for single-layer hoses and inks was repeated according to the following table. The QR code reading test was carried out on each of the samples obtained.

| Hose material | Ink | Successful readings |
| --- | --- | --- |
| Plasticised PVC | Polyester | 9/10 |
| Plasticised PVC | Polyurethane | 8/10 |
| Plasticised PVC | Silicone | 3/10 |
| Plasticised PVC | Epoxy | 1/10 |
| Santoprene ® | Polyester | 3/10 |
| Santoprene ® | Polyurethane | 2/10 |
| Santoprene ® | Silicone | 8/10 |
| Santoprene ® | Epoxy | 9/10 |

CONCLUSIONS

It was found that the compatibility between ink and the basic material of the hose varies according to the nature thereof. This compatibility affects the durability of the QR code printed on the hose, that is the readability thereof over time following surface abrasion.

Without being too bound to theory, it can be established that the basic material of the hose and the ink of the QR code are compatible with each other for the purposes of the present invention if the latter is can be read in at least 70% of the prepared samples.

The invention claimed is:

1. A method for manufacturing a flexible hose for the transportation of liquids or fluids, the method comprising the steps of:
providing at least one QR code strip comprising a transfer strip and a plurality of QR codes, the transfer strip being made of a polymeric strip material and having a length, the plurality of QR codes being QR codes according to the ISO/IEC 18004:2000 (E) standard and being arranged spaced apart from one another at a predetermined distance, each QR code of said plurality of QR codes consisting of a respective at least one ink layer;
extruding a first polymeric material by means of an extrusion head to obtain a flexible hose having at least one layer comprising an exposed surface, the extrusion head comprising an outlet and the exposed surface having a length;
coupling said at least one QR code strip to said exposed surface at the outlet of said extrusion head so as to hot transfer said QR codes onto respective portions of said exposed surface along the length of the exposed surface, said coupling comprising contacting the QR codes to the exposed surface; and
removing said at least one transfer strip from the exposed surface without removing the plurality of QR codes from the exposed surface,
wherein the polymeric strip material of said QR code strip is incompatible with said first polymeric material, and the at least one ink layer is compatible with said first polymeric material.

2. The method according to claim 1, wherein said at least one layer is the outermost layer of the flexible hose.

3. The method according to claim 2, wherein the compatibility between said at least one ink layer and said first polymeric material is such that said QR codes are abrasion resistant once hot transferred onto the exposed surface.

4. The method according to claim 1, wherein the flexible hose has a minimum external radius (R) of 4 mm, each QR code of the plurality of QR codes is square-shaped and has a maximum height of 7 mm, and each QR code of the plurality of QR codes comprises a matrix having a maximum of 25×25 modules.

5. The method according to claim 4, wherein each QR code of the plurality of QR codes have has at least one datum of the alphanumeric or kanji type, which includes from 20 to 29 characters, so that the error correction level of the plurality of QR codes is of level Q or H.

6. The method according to the claim 5, wherein the at least one datum of the alphanumeric or kanji type is a simplified web address connected to a webportal that traces back to an alphanumeric type web address having at least 30 characters.

7. The method according to claim 1, wherein the QR codes of the plurality of QR codes are spaced apart from one another by a distance that is equal to or less than 2 meters.

8. The method according to claim 1, wherein said at least one layer is a first layer, the flexible hose further comprises at least one second layer arranged inside said first layer and made of a second polymeric material, and the flexible hose further comprises at least one textile reinforcement interposed between said first layer and said at least one second layer.

9. The method according claim 8, wherein each of said first and second polymeric materials comprise a plasticized PVC matrix.

* * * * *